United States Patent
Huang et al.

(10) Patent No.: US 12,209,055 B2
(45) Date of Patent: Jan. 28, 2025

(54) CERAMIC MATERIAL AND CERAMIC OBJECT

(71) Applicant: Industrial Technology Research Institute, Hsinchu (TW)

(72) Inventors: Tien-Heng Huang, Tainan (TW); Yu-Han Wu, Taipei (TW); Kuo-Chuang Chiu, Hsinchu (TW); Chieh-Yu Yang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 82 days.

(21) Appl. No.: 17/564,082

(22) Filed: Dec. 28, 2021

(65) Prior Publication Data

US 2023/0202928 A1  Jun. 29, 2023

(51) Int. Cl.
*C04B 35/10* (2006.01)

(52) U.S. Cl.
CPC ...... *C04B 35/10* (2013.01); *C04B 2235/3217* (2013.01); *C04B 2235/3224* (2013.01); *C04B 2235/3232* (2013.01); *C04B 2235/3241* (2013.01); *C04B 2235/3244* (2013.01); *C04B 2235/3262* (2013.01); *C04B 2235/3275* (2013.01); *C04B 2235/3279* (2013.01)

(58) Field of Classification Search
CPC ............ C04B 35/10; C04B 2235/3217; C04B 2235/3224; C04B 2235/3244
See application file for complete search history.

(56) References Cited

U.S. PATENT DOCUMENTS

| | | | |
|---|---|---|---|
| 5,795,362 A | 8/1998 | Chatterjee et al. | |
| 6,641,940 B1 | 11/2003 | Li et al. | |
| 6,958,303 B2 | 10/2005 | Zhang et al. | |
| 7,247,588 B2 * | 7/2007 | Kwon ................ | C04B 35/4682 501/154 |
| 7,682,273 B2 | 3/2010 | Mott et al. | |
| 9,889,012 B2 | 2/2018 | Nimal | |
| 2002/0010070 A1 | 1/2002 | Cales et al. | |
| 2006/0066180 A1 | 3/2006 | Nanataki et al. | |
| 2010/0130346 A1 | 5/2010 | Laine et al. | |
| 2016/0052162 A1 | 2/2016 | Colin et al. | |

FOREIGN PATENT DOCUMENTS

| | | |
|---|---|---|
| CN | 1152844 C | 6/2004 |
| CN | 101061079 | 10/2007 |
| CN | 103496952 | 1/2014 |
| CN | 103769563 | 5/2014 |
| CN | 104193310 | 12/2014 |
| CN | 105541307 A | 5/2016 |
| CN | 106191496 | 12/2016 |
| CN | 106995308 A | 8/2017 |
| CN | 107662274 | 2/2018 |
| CN | 109336565 A | 2/2019 |
| CN | 109561177 | 4/2019 |
| CN | 109641758 A | 4/2019 |
| CN | 110803915 | 2/2020 |
| CN | 111233444 A * | 6/2020 |
| CN | 112194499 A | 1/2021 |
| CN | 113292323 A | 8/2021 |
| EP | 1702906 | 9/2006 |
| IN | 337944 | 4/2019 |
| JP | 4845469 | 12/2011 |
| JP | 5118294 | 1/2013 |
| JP | 2013056809 A | 3/2013 |
| WO | WO2012134449 | 10/2012 |

OTHER PUBLICATIONS

Shulman, H. S., et al. "Optimization of yttria additions in zirconia toughened alumina." Journal of the Australasian Ceramic Society 34.2 (1998): 127-131. (Year: 1998).*
CN111233444A machine translation (Year: 2020).*
Terawat Tosiriwatanapong et al., "Zirconia-Based Biomaterials for Hard Tissue Reconstruction", Bone and Tissue Regeneration insights, 9 pages, vol. 9: 1-9, 2018, The Authors, UK.
Ashis Kumar Dey et al., "Dry sliding wear of zirconia-toughened alumina with different metal oxide additive", Elsevier, Ceramics International vol. 35, Issue 3, Apr. 2009, pp. 997-1002, Elsevier.
China Patent Office, Office Action, Patent Application Serial No. 202111623247.5, Dec. 8, 2023, China.

* cited by examiner

*Primary Examiner* — James A Fiorito
*Assistant Examiner* — Cameron K Miller

(57) ABSTRACT

A ceramic material includes zirconia toughened alumina (ZTA) doped with scandium (Sc) ions. ZTA can be further doped with other metal ions, and the other metal ions include cobalt (Co) ions, chromium (Cr) ions, zinc (Zn) ions, titanium (Ti) ions, manganese (Mn) ions, nickel (Ni) ions, or a combination thereof. The ceramic material can be used as a ceramic object, such as a wire bonding capillary, a heat dissipation plate, a denture tooth, orthopedic implants, direct bonded copper, or a high-temperature co-fired ceramic.

8 Claims, No Drawings

CERAMIC MATERIAL AND CERAMIC OBJECT

TECHNICAL FIELD

The technical field is related to a ceramic object, and in particular it is related to the ceramic material thereof.

BACKGROUND

The top 10 global IC packaging and testing manufacturers use more than 100,000 wire bonding machines, and the output value of the capillary used in the wire bonding machines is more than 500 million US dollars per year. The imported value of Taiwan's IC and LED packaging industry is approximately 250 million US dollars per year. Since the capillary needs to contact the electrodes (solder points) of the chip and the lead frame at a high speed, it will become worn down or deformed after being utilized a certain number of times (about 600,000 points), thereby resulting in problems such as disconnections or poor contacts. As such, it is necessary to develop domestic capillary products with ultra-precision, high strength and long lifespans.

Therefore, developing a ceramic material with excellent wear resistance and corrosion resistance, as well as high strength and high toughness is called for to meet the requirements on wire bonding capillaries and other ceramic objects.

SUMMARY

One embodiment of the disclosure provides a ceramic material, including zirconia toughened alumina (ZTA) doped with scandium (Sc) ions.

In some embodiments, the alumina and the zirconia have a weight ratio of 100:15 to 100:35.

In some embodiments, the zirconia toughened alumina and the scandium ions have a weight ratio of 100:0.05 to 100:2.

In some embodiments, the zirconia toughened alumina is further doped with other metal ions, and the other metal ions comprise cobalt (Co) ions, chromium (Cr) ions, zinc (Zn) ions, titanium (Ti) ions, manganese (Mn) ions, nickel (Ni) ions, or a combination thereof.

In some embodiments, the zirconia toughened alumina and the other metal ions have a weight ratio of 100:0.05 to 100:2.

In some embodiments, the scandium ions and the other ions have a weight ratio of 1:0.05 to 1:1.25.

In some embodiments, the ceramic material has a hardness of 1600 Hv10 to 2200 Hv10.

In some embodiments, the ceramic material has a bending strength of 400 MPa to 500 MPa.

One embodiment of the disclosure provides a ceramic object, including zirconia toughened alumina (ZTA) doped with scandium (Sc) ions.

In some embodiments, the zirconia toughened alumina is further doped with other metal ions, and the other metal ions comprise cobalt (Co) ions, chromium (Cr) ions, zinc (Zn) ions, titanium (Ti) ions, manganese (Mn) ions, nickel (Ni) ions, or a combination thereof.

In some embodiments, the ceramic object includes a wire bonding capillary, a heat dissipation plate, a denture tooth, orthopedic implants, a direct bonded copper, or a high-temperature co-fired ceramic.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a ceramic material, including zirconia toughened alumina (ZTA) doped with scandium (Sc) ions. In some embodiments, the alumina and the zirconia have a weight ratio of 100:15 to 100:35, e.g. about 100:18, about 100:20, about 100:22, about 100:25, about 100:28, about 100:30, or the like, but the disclosure is not limited thereto. If the amount of the zirconia is too low or too high, it cannot achieve the effect of toughening the alumina. In some embodiments, the zirconia toughened alumina and the scandium ions have a weight ratio of 100:0.05 to 100:2, e.g. about 100:0.1, about 100:0.5, about 100:0.75, about 100:1, about 100:1.2, about 100:1.3, about 100:1.5, about 100:1.8, or the like, but the disclosure is not limited thereto. If the amount of the scandium ions is too low or too high, both the hardness and the bending strength of the ceramic material will be insufficient.

In some embodiments, the zirconia toughened alumina is further doped with other metal ions, and the other metal ions comprise cobalt (Co) ions, chromium (Cr) ions, zinc (Zn) ions, titanium (Ti) ions, manganese (Mn) ions, nickel (Ni) ions, or a combination thereof, in addition to the scandium ions. If the other metal ions utilize any other metal ions (besides the described other metal ions), e.g. lanthanum (La) ions, gadolinium (Gd) ions, or iron (Fe) ions, it will be difficult to achieve the required properties of the ceramic material.

In some embodiments, the zirconia toughened alumina and the other metal ions have a weight ratio of 100:0.05 to 100:2, e.g. about 100:0.1, about 100:0.5, about 100:0.75, about 100:1, about 100:1.25, about 100:1.4, about 100:1.5, about 100:1.75, or the like, but the disclosure is not limited thereto. If the amount of the other metal ions is too low or too high, both the hardness and the bending strength of the ceramic material will be insufficient. In some embodiments, the scandium ions and the other ions have a weight ratio of 1:0.05 to 1:1.25, e.g. about 1:0.05 to 1:1.2, about 1:0.06 to 1:0.9, about 1:0.08 to 1:1.2, about 1:0.1 to 1:1.15, about 1:0.2 to 1:1.12, about 1:0.5 to 1:1.1, about 1:1, about 1:0.75, or the like, but the disclosure is not limited thereto. If the amount of the scandium ions is too high, the hardness of the ceramic material will be poor. If the amount of the other metal ions is too high, the hardness of the ceramic material will be also poor.

In some embodiments, the ceramic material may have a hardness of 1600 Hv10 to 2200 Hv10, e.g. about 1605 Hv10 to 1768 Hv10, about 1605 Hv10 to 1736 Hv10, about 1605 Hv10 to 1730 Hv10, about 1605 Hv10 to 1963 Hv10, about 1939 Hv10, or the like, but the disclosure is not limited thereto. If the hardness of the ceramic material is too low, it cannot meet the specification of the wire bonding capillary. In some embodiments, the ceramic material may have a bending strength of 400 MPa to 500 MPa, e.g. about 415 MPa, about 430 MPa, about 450 MPa, about 475 MPa, about 490 MPa, or the like, but the disclosure is not limited thereto. If the bending strength of the ceramic material is too low, it cannot meet the specification of the wire bonding capillary.

The ceramic material in one embodiment of the disclosure can be used as wire bonding capillary. In addition, the ceramic material can be used as another ceramic object, such as a heat dissipation plate, a denture tooth, orthopedic implants, a direct bonded copper (DBC), or a high-temperature co-fired ceramic (HTCC), but the disclosure is not limited thereto.

The ceramic material can be formed by mixing an appropriate ratio of alumina and zirconia to form zirconia toughened alumina (ZTA). Subsequently, an appropriate ratio of ZTA and a scandium source are mixed. The scandium source can be oxide, acetate salt, nitrate salt, or another suitable salt. The mixture is then ground to form powder, which is molded and sintered to form a ceramic material. On the other hand, an appropriate ratio of ZTA, a scandium source, and another metal source are mixed. The scandium source and the other metal source can be oxide, acetate salt, nitrate salt, or another suitable salt. The mixture is then ground to form powder, which are molded and sintered to form a ceramic material. It's worth noting that the described method is one of the methods (not only) to form the ceramic material, and the disclosure is not limited thereto. One skilled in the art may adopt any other applicable method to dope appropriate amounts of the scandium ions and the other metal ions into ZTA to form the described ceramic material.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

In following Examples, the hardness of the ceramic material was measured according to the standard CNS 13983 (Test method for vickers hardness of fine ceramics). In following Examples, the bending strength of the ceramic material was measured according to the standard CNS 12701 (Test method for flexural strength (modulus of rupture) of fine ceramics at room temperature).

Example 1

$Al_2O_3$ (56.8 g, 100 wt %) and $ZrO_2$ (20 g, 35 wt %) were firstly mixed to form zirconia toughened alumina (ZTA). 100 parts by weight of ZTA and scandium oxide (containing 0.013 parts by weight of Sc ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m² to manufacture a round body with a diameter of 11 mm, which was heated to 1500° C. to 1650° C. and kept for 1 hour to obtain a ceramic material. The composition ratio and hardness of the ceramic materials are tabulated in Table 1. Alternatively, 100 parts by weight of ZTA, scandium oxide (containing 0.013 parts by weight of Sc ions), and cobalt oxide (containing 0.015 parts by weight of Co ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m² to manufacture a round body with a diameter of 11 mm, which was heated to 1500° C. to 1650° C. and kept for 1 hour to obtain a ceramic material. The composition ratio and hardness of the ceramic materials are tabulated in Table 1. As shown in Table 1, the hardness of the ceramic materials doped with Sc ions could be increased from 1414.1 Hv10 to 1605.3 Hv10. The hardness of the ceramic materials doped with Sc ions and Co ions could be increased from 1414.1 Hv10 to 1935.5 Hv10, and the bending strength thereof could be 473.8 MPa.

TABLE 1

| ZTA | Sc | Co | Hv10 |
| --- | --- | --- | --- |
| 100 | 0 | 0 | 1414.1 |
| 100 | 0.013 | 0 | 1605.3 |
| 100 | 0.013 | 0.015 | 1935.5 |

Example 2

$Al_2O_3$ (56.8 g, 100 wt %) and $ZrO_2$ (20 g, 35 wt %) were firstly mixed to form zirconia toughened alumina (ZTA). 100 parts by weight of ZTA, scandium oxide (containing 0.013 parts by weight of Sc ions), and chromium oxide (containing 0.014 to 0.027 parts by weight of Cr ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m² to manufacture a round body with a diameter of 11 mm, which was heated to 1500° C. to 1650° C. and kept for 1 hour to obtain a ceramic material. The composition ratio and hardness of the ceramic materials are tabulated in Table 2. Alternatively, 100 parts by weight of ZTA, scandium oxide (containing 0.026 parts by weight of Sc ions), and chromium oxide (containing 0.014 parts by weight of Cr ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m² to manufacture a round body with a diameter of 11 mm, which was heated to 1500° C. to 1650° C. and kept for 1 hour to obtain a ceramic material. The composition ratio and hardness of the ceramic materials are tabulated in Table 2. As shown in Table 2, the hardness of the ceramic materials doped with Sc ions and Cr ions (in which the Sc ions and the Cr ions had a weight ratio of about 1:0.05 to 1:0.93, such as 1:0.93) could be increased from 1414.1 Hv10 to 1768.3 Hv10, and the bending strength thereof could be 452.7 MPa. However, the hardness of the ceramic material was decreased by further increasing the doping amounts of the Cr ions.

TABLE 2

| ZTA | Sc | Cr | Hv10 |
| --- | --- | --- | --- |
| 100 | 0 | 0 | 1414.1 |
| 100 | 0.013 | 0 | 1605.3 |
| 100 | 0.026 | 0.014 | 1623.1 |
| 100 | 0.013 | 0.014 | 1768.3 |
| 100 | 0.013 | 0.027 | 1327.9 |

Example 3

$Al_2O_3$ (64 g, 100 wt %) and $ZrO_2$ (12.8 g, 20 wt %) were firstly mixed to form zirconia toughened alumina (ZTA). 100 parts by weight of ZTA, scandium oxide (containing 0.013 parts by weight of Sc ions), and zinc oxide (containing 0.016 parts by weight of Zn ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 3.

TABLE 3

| ZTA | Sc | Zn | Hv10 |
| --- | --- | --- | --- |
| 100 | 0 | 0 | 1414.1 |
| 100 | 0.013 | 0 | 1605.3 |
| 100 | 0.013 | 0.016 | 1736.8 |

Example 4

$Al_2O_3$ (61.7 g, 100 wt %) and $ZrO_2$ (11.2 g, 18.1 wt %) were firstly mixed to form zirconia toughened alumina (ZTA). 100 parts by weight of ZTA, scandium oxide (containing 0.013 parts by weight of Sc ions), and titanium oxide (containing 0.012 parts by weight of Ti ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 4.

TABLE 4

| ZTA | Sc | Ti | Hv10 |
| --- | --- | --- | --- |
| 100 | 0 | 0 | 1414.1 |
| 100 | 0.013 | 0 | 1605.3 |
| 100 | 0.013 | 0.012 | 1720.7 |

Example 5

$Al_2O_3$ (61.5 g, 100 wt %) and $ZrO_2$ (12.5 g, 20.4 wt %) were firstly mixed to form zirconia toughened alumina (ZTA). 100 parts by weight of ZTA, scandium oxide (containing 0.013 parts by weight of Sc ions), and manganese oxide (containing 0.0128 parts by weight of Mn ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 5.

TABLE 5

| ZTA | Sc | Mn | Hv10 |
| --- | --- | --- | --- |
| 100 | 0 | 0 | 1414.1 |
| 100 | 0.013 | 0 | 1605.3 |
| 100 | 0.013 | 0.0128 | 1963.9 |

Example 6

$Al_2O_3$ (61.7 g, 100 wt %) and $ZrO_2$ (12.05 g, 19.5 wt %) were firstly mixed to form zirconia toughened alumina (ZTA). 100 parts by weight of ZTA, scandium oxide (containing 0.013 parts by weight of Sc ions), and nickel oxide (containing 0.016 parts by weight of Ni ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 6.

TABLE 6

| ZTA | Sc | Ni | Hv10 |
| --- | --- | --- | --- |
| 100 | 0 | 0 | 1414.1 |
| 100 | 0.013 | 0 | 1605.3 |
| 100 | 0.013 | 0.016 | 1939.9 |

Comparative Example 1

$Al_2O_3$ (64 g, 100 wt %) and $ZrO_2$ (12.8 g, 20 wt %) were firstly mixed to form zirconia toughened alumina (ZTA). 100 parts by weight of ZTA, scandium oxide (containing 0.013 parts by weight of Sc ions), and lanthanum oxide (containing 0.0176 parts by weight of La ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 7. As shown in Table 7, not all metal ions are suitable to collocate with Sc ions for doping ZTA to increase the hardness of ZTA.

TABLE 7

| ZTA | Sc | La | Hv10 |
| --- | --- | --- | --- |
| 100 | 0 | 0 | 1414.1 |
| 100 | 0.013 | 0 | 1605.3 |
| 100 | 0.013 | 0.0176 | 1401.9 |

Comparative Example 2

Al$_2$O$_3$ (64 g, 100 wt %) and ZrO$_2$ (12.8 g, 20 wt %) were firstly mixed to form zirconia toughened alumina (ZTA). 100 parts by weight of ZTA, scandium oxide (containing 0.013 parts by weight of Sc ions), and gadolinium oxide (containing 0.0179 parts by weight of Gd ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 8. As shown in Table 8, not all metal ions are suitable to collocate with Sc ions for doping ZTA to increase the hardness of ZTA.

TABLE 8

| ZTA | Sc | Gd | Hv10 |
|---|---|---|---|
| 100 | 0 | 0 | 1414.1 |
| 100 | 0.013 | 0 | 1605.3 |
| 100 | 0.013 | 0.0179 | 1585.1 |

Comparative Example 3

Al$_2$O$_3$ (64 g, 100 wt %) and ZrO$_2$ (12.8 g, 20 wt %) were firstly mixed to form zirconia toughened alumina (ZTA). 100 parts by weight of ZTA, scandium oxide (containing 0.013 parts by weight of Sc ions), and iron oxide (containing 0.0144 parts by weight of Fe ions) were mixed, and the mixture powder and 80 g of ethanol were added into a ball-milling pot to be put into a ball-milling machine, and then ball-milling mixed for 24 hours. The ball-milling product was dried and ground to form powder. An appropriate amount of the powder was pressed under a pressure of 40 kg/m$^2$ to manufacture a round body with a diameter of 11 mm, which was heated to 1500° C. to 1650° C. and kept for 1 hour to obtain a ceramic material. The composition ratio and hardness of the ceramic materials are tabulated in Table 9. As shown in Table 9, not all metal ions are suitable to collocate with Sc ions for doping ZTA to increase the hardness of ZTA.

TABLE 9

| ZTA | Sc | Fe | Hv10 |
|---|---|---|---|
| 100 | 0 | 0 | 1414.1 |
| 100 | 0.013 | 0 | 1605.3 |
| 100 | 0.013 | 0.0144 | 1291.1 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A ceramic material, comprising:
   zirconia toughened alumina (ZTA) doped with scandium (Sc) ions and other metal ions,
   wherein the other metal ions are cobalt (Co) ions, chromium (Cr) ions, zinc (Zn) ions, titanium (Ti) ions, manganese (Mn) ions, or nickel (Ni) ions, and
   wherein the zirconia toughened alumina and the other metal ions have a weight ratio of 100:0.012 to 100:0.016.

2. The ceramic material as claimed in claim 1, wherein the alumina and the zirconia have a weight ratio of 100:15 to 100:35.

3. The ceramic material as claimed in claim 1, wherein the zirconia toughened alumina and the scandium ions have a weight ratio of 100:0.013 to 100:0.026.

4. The ceramic material as claimed in claim 1, wherein the scandium ions and the other metal ions have a weight ratio of 1:0.05 to 1:1.25.

5. The ceramic material as claimed in claim 1, having a hardness of 1600 Hv10 to 2200 Hv10.

6. The ceramic material as claimed in claim 1, having a bending strength of 400 MPa to 500 MPa.

7. A ceramic object, comprising:
   zirconia toughened alumina (ZTA) doped with scandium (Sc) ions and other metal ions,
   wherein the other metal ions are cobalt (Co) ions, chromium (Cr) ions, zinc (Zn) ions, titanium (Ti) ions, manganese (Mn) ions, or nickel (Ni) ions, and
   wherein the zirconia toughened alumina and the other metal ions have a weight ratio of 100:0.012 to 100:0.016.

8. The ceramic object as claimed in claim 7, comprising a wire bonding capillary, a heat dissipation plate, a denture tooth, orthopedic implants, a direct bonded copper, or a high-temperature co-fired ceramic.

* * * * *